United States Patent [19]

Kataoka

[11] Patent Number: 4,836,131
[45] Date of Patent: Jun. 6, 1989

[54] SOLDER COATING APPARATUS

[75] Inventor: Shigeaki Kataoka, Shizuoka, Japan

[73] Assignee: Fuji Seiki Machine Works, Ltd., Shizuoka, Japan

[21] Appl. No.: 100,189

[22] Filed: Sep. 23, 1987

[30] Foreign Application Priority Data

Oct. 24, 1986 [JP]  Japan ................................ 61-251925

[51] Int. Cl.$^4$ .............................................. B05C 1/08
[52] U.S. Cl. .................... 118/220; 118/221; 118/222; 118/227
[58] Field of Search ............... 118/221, 222, 227, 211, 118/220

[56]  References Cited

U.S. PATENT DOCUMENTS

| | | | |
|---|---|---|---|
| 1,654,214 | 12/1927 | Evans . | |
| 1,707,611 | 4/1929 | Hamberger et al. | 118/227 |
| 1,788,610 | 1/1931 | Ashworth et al. | 118/227 |
| 2,588,967 | 3/1952 | Davis | 118/227 X |
| 2,754,798 | 7/1956 | Tilden | 118/222 X |
| 3,006,318 | 10/1961 | Monroe, Jr. et al. | 118/227 X |
| 3,882,816 | 5/1975 | Booz et al. | 118/57 |
| 4,594,962 | 6/1986 | Focke | 118/221 |

FOREIGN PATENT DOCUMENTS 526301  9/1940  United Kingdom ................ 118/227

Primary Examiner—John McIntosh
Attorney, Agent, or Firm—Flynn, Thiel, Boutell & Tanis

[57]  ABSTRACT

A soldering machine for simultaneously applying liquid solder to opposite sides of the leads of a lead frame having I.C. devices thereon. The machine has sidewardly spaced roller assemblies which define a vertically extending narrow nip therebetween through which the lead frame assemblies pass. A solder bath is disposed below the roller assemblies so that lower portions of the rollers dip into the bath and carry a solder film to the nip for application to opposite sides of the leads. A passage extends upwardly in isolation from the bath for permitting the lead frame to be fed vertically upwardly into and through the nip.

7 Claims, 4 Drawing Sheets

U.S. Patent    Jun. 6, 1989    Sheet 1 of 4    4,836,131
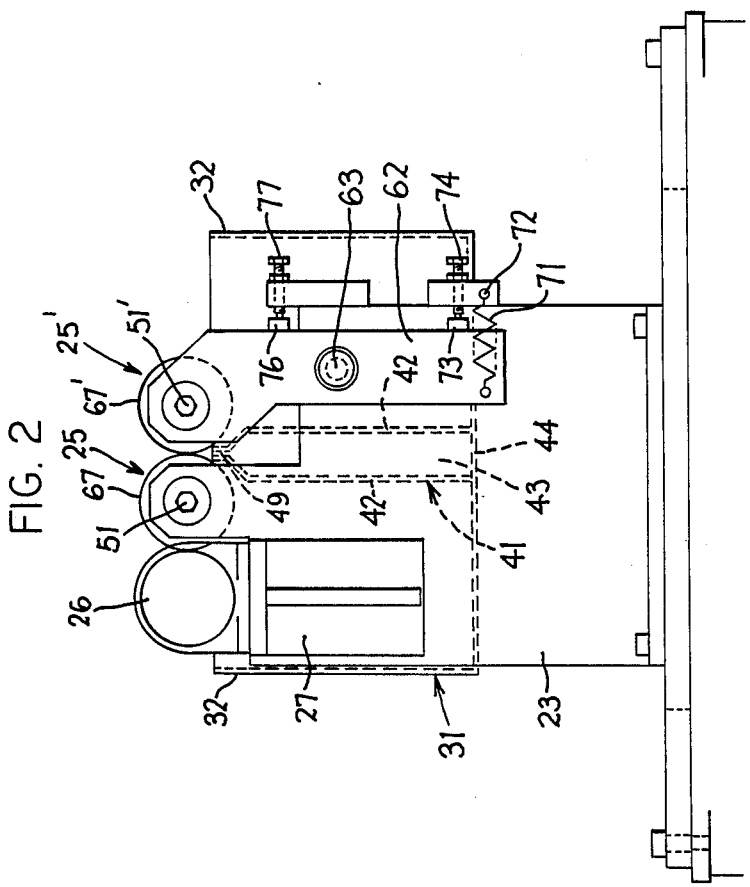
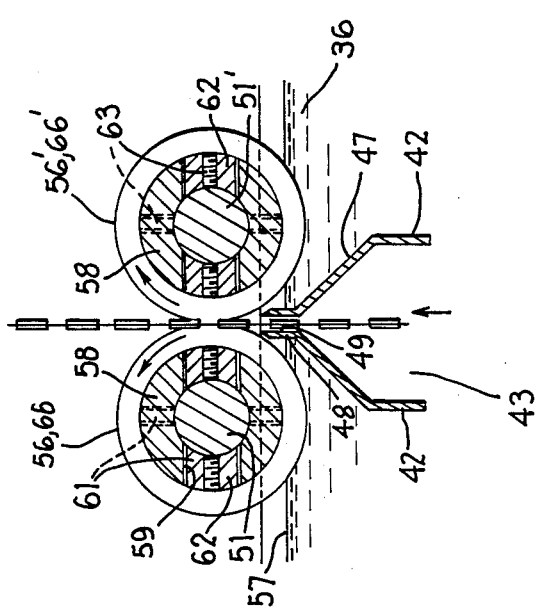

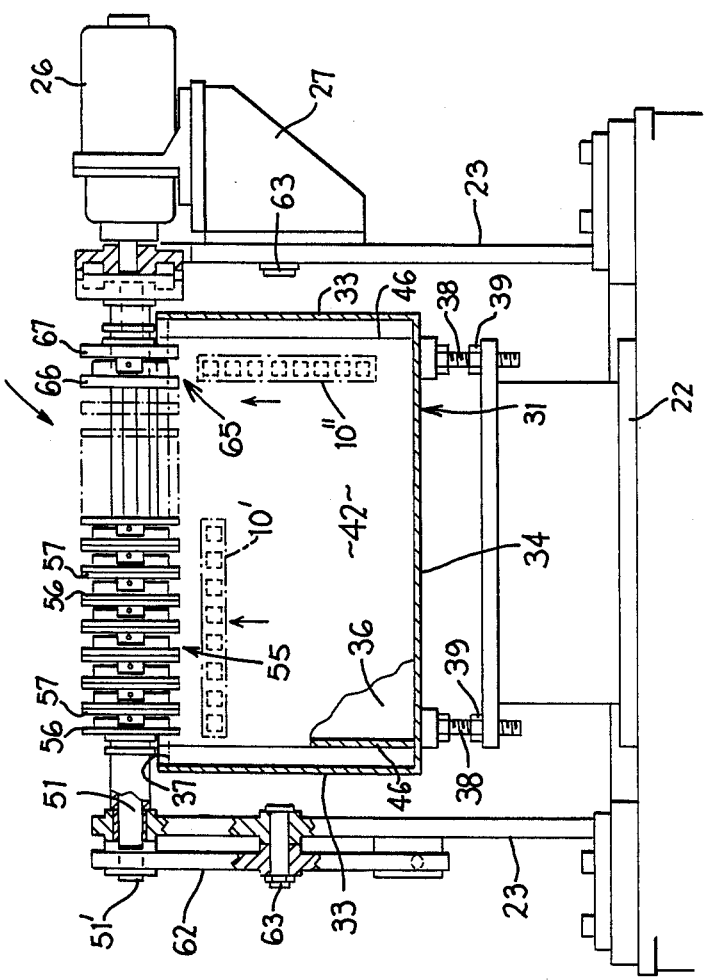

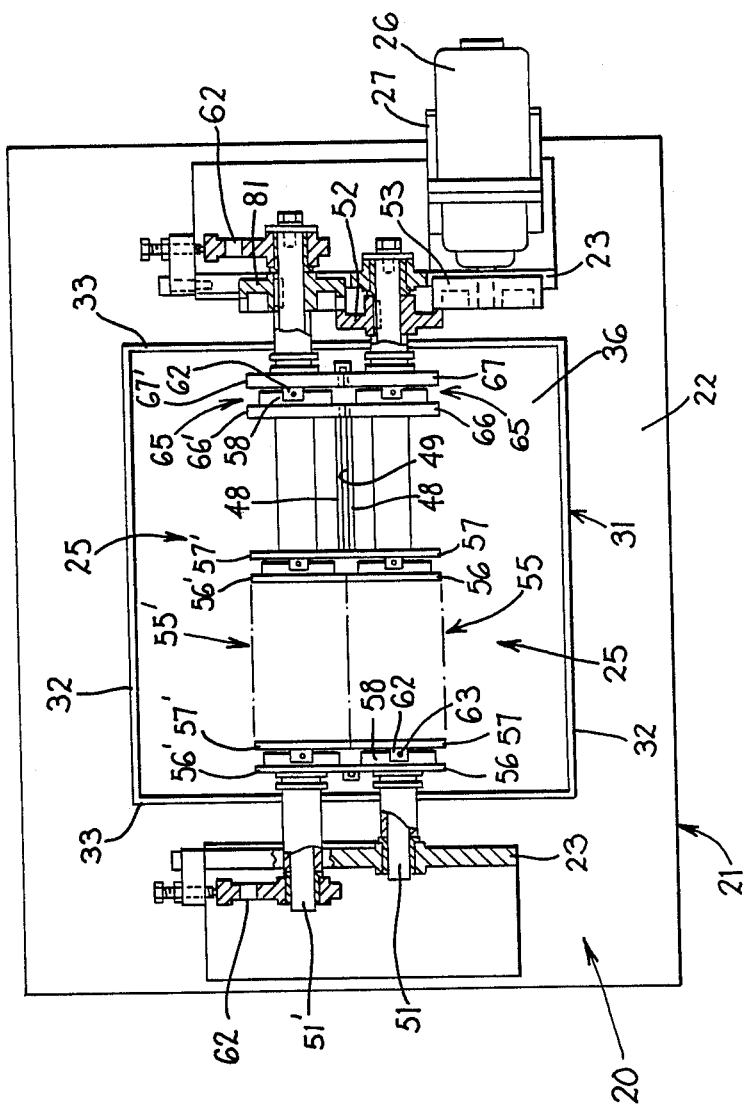

SOLDER COATING APPARATUS

FIELD OF THE INVENTION

This invention relates to an apparatus for solder coating the leads associated with the lead frame of an I.C. device.

BACKGROUND OF THE INVENTION

An I.C. (integrated circuit) device is formed by an I.C. chip encapsulated within a resin package, as by a molding operation, and the chip connects to a plurality of pins (generally referred to as "leads") which project outwardly beyond the sides of the resin package. These leads are part of a lead frame which is generally elongated so that several such I.C. devices are formed longitudinally in spaced relationship therealong, with the I.C. devices thereafter being separated or severed from the longitudinally extending edge strips of the lead frame.

As is well known, the leads are typically coated with solder, which coating generally occurs in one of two different ways. In a first common technique, each I.C. device is separated from the lead frame, its leads are then bent downwardly substantially at right angles at their point of projection from the resin package, and the bent leads of the individual I.C. device are then dipped into a bath of liquid solder. The second conventional technique involves maintaining the plurality of I.C. devices integrally connected to the elongate lead frame so as to define a relatively flat package having a plurality of I.C. devices thereon, with this package in its entirety then being dipped into a bath of liquid solder.

The above commonly utilized soldering techniques, however, are known to possess several disadvantages.

For example, with respect to the first technique mentioned above, this is disadvantageous since the number of processing and handling steps are significant, and this process is thus both complex and inefficient.

A further disadvantage associated with these techniques is the inability to coat the leads with a film having the desired uniformity of thickness. These conventional techniques often result in extremely heavy or thick solder films on the leads, and particularly with I.C. devices wherein the width between the leads is extremely small, these soldering techniques often tend to create solder bridges which extend between the leads due to the surface tension of the solder. The formation of such bridges causes the I.C. device to be defective.

Still a further disadvantage associated particularly with the second technique is due to the fact that the entire I.C. device is dipped in the hot solder bath. Since the melting point of commonly used solder material is about 200° C., and since the molten material is maintained at least at about this temperature, which temperature will exceed the typical temperature of the lead frame and I.C. devices by about 170° C., this excessive temperature difference imposes a substantial heat shock on the I.C. devices when they are immersed into the solder bath. This heat shock can cause significant damage, such as to the I.C. chip within the resin package. Thus, use of this technique has been observed to significantly increase the number of defects and hence the rejection rate of the I.C. devices.

It is thus an object of this invention to provide a soldering apparatus, particularly for soldering the leads associated with I.C. devices mounted on a lead frame, which apparatus successfully overcomes or significantly minimizes many of the known disadvantages as associated with conventional techniques of the type described above.

More specifically, the present invention relates to an apparatus which permits automatic and efficient solder coating of the leads associated with a plurality of I.C. devices as mounted on a lead frame prior to severing of the I.C. devices from the lead frame. This apparatus in particular provides for application of a desired uniform thickness of coating on the leads, while at the same time substantially prevents creation of solder bridges between the leads. This apparatus also prevents the resin packages from contacting the hot molten solder, and thus avoids severe heat shock to the I.C. devices. The rejection rate of I.C. devices is hence significantly reduced, whereby I.C. devices can be solder coated in a more efficient and economical manner.

In the apparatus of this invention, a pair of rollers assemblies are provided for pinching the lead sections of the lead frame therebetween and applying a thin coating or film of solder thereto. The pair of roller assemblies each includes two axially spaced rollers which respectively cooperate with similar axially spaced rollers associated with the other assembly, thereby defining two cooperating sets of counter-rotating rollers which are axially spaced apart. At least one of tee rollers has a lower part thereof which passes through a molten solder bath. The lead frame is passed between the rollers so that the leads associated with opposite sides of the resin package are effectively pinched or passed through the nip defined between the opposed rollers of the two sets, whereby a thin solder film is applied to at least one side of the leads. At the same time the enlarged resin package passes freely through the space defined between the axially spaced rollers so as to be free of any significant contact with the hot molten solder.

In the apparatus of this invention, the pair of axially spaced rollers associated with each assembly are preferably capable of being shifted axially relative to their rotational axis to increase or decrease the axial spacing therebetween to accommodate the size of the resin package which passes through said space.

Other objects and purposes of the invention will be apparent upon reading the following specification and inspecting the accompanying drawings.

BRIEF DESCRIPTION OF THE DRAWINGS

FIG. 1 is a fragmentary side elevational view of a machine according to the present invention as taken substantially along line I—I in FIG. 3.

FIG. 2 is an end elevational view of the machine shown in FIG. 3.

FIG. 3 is a front elevational view, partially in cross section, of the soldering machine.

FIG. 4 is a top view of the machine.

Figure 5:
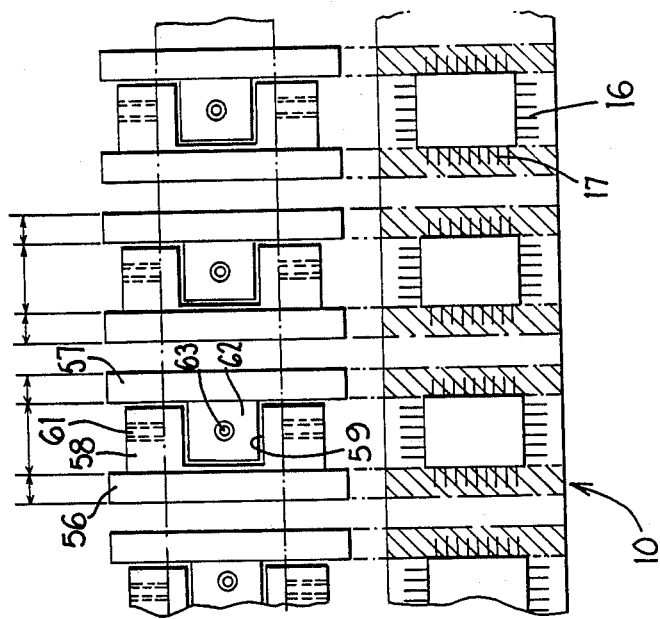
FIG. 5 is an enlarged diagrammatic view illustrating the relationship of the lead frame to the rollers.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the machine and designated parts thereof. Said terminology will include the words specifically mentioned, derivatives thereof, and words of similar import.

DETAILED DESCRIPTION

Figure 6:
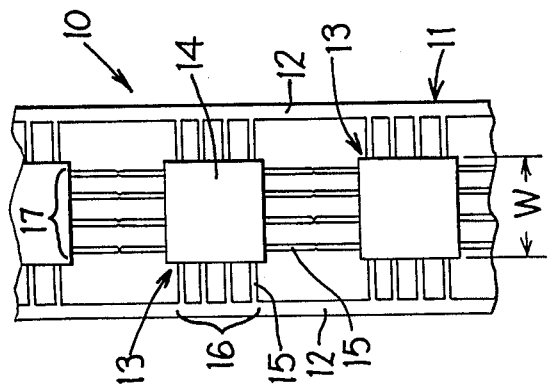
FIG. 6 is a fragmentary plan view of a typical lead frame having several I.C. devices mounted in longitudinally spaced relationship thereon.

Referring first to FIG. 6, there is illustrated a typical elongate lead frame assembly 10 which conventionally includes a flat platelike lead frame 11 having side strips or rails 12 extending longitudinally therealong. A plurality of I.C. devices 13 are secured to the lead frame 11 in longitudinally spaced relation therealong. Each I.C. device 13 typically includes an I.C. chip which is encapsulated within a blocklike resin body or package 14. A plurality of pins (i.e., leads) 15 which are integral with the lead frame 11 project outwardly from the sides of the package 14 in substantially planar relationship with the lead frame. The I.C. device 13 conventionally has sets or groups of leads 15 projecting outwardly from parallel opposite sides of the package and, in the illustrated embodiment, such leads project outwardly from both pairs of opposite sides. The plurality of leads 15 which project outwardly from one side will, for convenience in reference herein, be referred to as side and longitudinal lead sections 16 and 17, respectively.

After the arrangement illustrated by FIG. 6 has been solder coated in accordance with the apparatus of this invention, then the side lead sections 16 are severed from the adjacent side strips 12, and the longitudinally extending lead sections 17 are severed at a point located between longitudinally adjacent devices 13 so as to separate each device from the lead frame 11.

Referring now to FIGS. 1-4, there is illustrated an improved soldering machine 20 according to the present invention, which machine is designed specifically for permitting soldering of the lead sections 16 and 17 as associated with the lead frame assembly 10. This machine 20 includes a frame or housing 21 having a base plate 22 and a pair of spaced supports 23 projecting upwardly therefrom. These supports 23 support thereon, in upwardly spaced relationship, a pair of sidewardly spaced roller assemblies 25 and 25'. These roller assemblies are rotatably driven from a drive means 26, such as a variable speed motor, the latter being supported on a bracket 27 secured to one of the uprights 23.

The roller assemblies 25,25' are disposed directly over an upwardly opening tank 31 which defines therein an upwardly opening compartment 36 for containing a bath of molten solder. This tank 31 is defined by generally parallel side walls 32 which are joined together by end walls 33, with the bottom of the tank being closed by a bottom wall 34. The compartment 36 as defined within the tank contains a bath of liquid solder, the surface level of the bath being indicated by the dash-dot line 37 in FIG. 3.

The elevation of the tank 31, and hence the elevation of the surface 37 of the solder bath, is preferably vertically adjustable. For this purpose, the tank 31 in the illustrated embodiment has threaded feet 38 which project downwardly therefrom for engagement with a stationary support plate 24 which is part of the frame. The threaded feet 38 cooperate with nuts 39 so that relative rotation between the feet 38 and nuts 39 permits the elevation of tank 31 to be selectively adjusted. Numerous other adjusting structures, such as conventional mechanical jacks or fluid pressure cylinders, can also be associated with the underside of the tank for controlling the elevation thereof.

The tank 31 also has a tubular wall structure 41 extending vertically therethrough in inwardly spaced relationship from the tank side walls so as to define a vertical passage through which the lead frame assemblies can be moved while maintaining them isolated from the solder bath. This wall structure 41 includes generally parallel side walls 42 which are spaced inwardly a significant distance from the tank side walls 32. These side walls 42 are nevertheless still spaced a significant distance apart so as to define a vertically extending passage or slot 43 therebetween, which passage opens outwardly at 44 through the bottom wall 34 of the tank. The tubular wall structure 41 also includes end walls 46 which extend between the side walls 42 so as to close off the perimeter of the passage 43. Walls 46 are spaced inwardly a small distance from the adjacent end walls 33 of the tank. The side walls 42, adjacent their upper ends, have inwardly sloped portions 47 (FIG. 1) which, at their inner ends, terminate in upwardly projecting flange portions 48 which project upwardly to a level substantially flush with the upper edge of the tank 31. These flange portions 48 project upwardly through the upper surface level 37 of the solder bath, and define a narrow slot 49 therebetween which is elongated horizontally of the tank and which provides upward communication from the passage 43 to the environment or atmosphere disposed above the solder bath. This slot 49 has a width, as measured between the flanges 48, which preferably slightly exceeds the width of the lead frame assembly 10 so as to provide close guiding of the assembly when it passes upwardly through the slot and then between the roller assemblies 25 and 25', as explained hereinafter.

The roller assemblies 25 and 25' are substantially identical, and hence only the roller assembly 25 will be hereinafter described in detail, it being understood that corresponding parts of the roller assembly 25' are being designated by the same reference numerals but with the addition of a prime (') thereto.

Considering now the roller assembly 25, same includes a first drive shaft 51 which extends generally horizontally between and has opposite ends thereof freely rotatably supported on the upright supports 23. This shaft 51 extends generally across the open upper mouth of the tank and is disposed so that it is generally parallel with the elongated direction of the slot 49 and is sidewardly spaced therefrom. Shaft 51 has a suitable driving element such as a gear 52 thereon, the latter being engaged with a further gear 53 which is driven from the drive motor 26.

Roller assembly 25 includes a first roller arrangement 55 which is nonrotatably mounted on the shaft 51 and is adapted for cooperating with a lead frame assembly 10 when the latter is oriented with its elongated direction extending generally parallel with the shaft substantially as illustrated by the lead frame arrangement 10' illustrated in FIG. 3. For this purpose, the roller arrangement 55 includes cooperating pairs of axially spaced rollers 56-57, with several such pairs (eight in the illustrated embodiment) being disposed in axially adjacent relationship along the shaft 51.

As illustrated by FIGS. 1 and 5, the roller 56 has a reduced diameter cylindrical hub 58 projecting axially therefrom toward the cooperating roller 57 of the same pair, which hub 58 is of reduced diameter and has a slot 59 which extends diametrically thereacross and opens inwardly from the free end thereof. A pair of shaft locking devices, such as set screws 61, project diametrically throughout the sides of the hub 58 to fixedly but releasably secure the roller 56 to the shaft 51. The other roller 57 of the cooperating pair also has a reduced-diameter hub portion 62 projecting axially therefrom into the slot 59 so as to both rotatably couple the rollers 56 and 57 together and also permit them to be closely axially spaced. This hub 62 also has diametrically opposite fasteners such as set screws 63 extending therethrough so as to fixedly but releasably secure the roller 57 to the shaft 51.

As indicated in FIG. 5, the rollers 56 and 57 are of the same diameter and have an axial face width Y which substantially equals or preferably slightly exceeds the length of the leads associated with the lead section so that the lead section 16 can hence pass through the nip between opposed rollers and be intimately contacted by the annular faces associated with the rollers 56 and 57. Further, the space W between the cooperating pair of rollers 56 and 57 substantially corresponds to the width of the resin package associated with the I.C. device so that this resin package can freely pass through the clearance space as measured by this distance W between the cooperating pair of rollers 56–57. The width W of the space can be selectively adjusted to correspond with the package width by adjustably moving the rollers 56 and 57 axially along the shaft, such as by loosening the set screws 61 and 63 and then relocking the set screws after the rollers have been appropriately positioned. Numerous other adjusting structures could also be provided to permit the rollers 56 and 57 to be axially adjusted to select the dimension of the space W.

As illustrated by FIGS. 3 and 5, the roller arrangement 55 includes a plurality of pairs of rollers 56–57 disposed in axially adjacent relationship along the shaft, the rollers 56–57 of each pair being identical, with adjacent pairs being uniformly spaced throughout the arrangement so as to permit a sidewardly oriented lead frame assembly 10' to pass between the roller arrangements 55 and 55'.

As illustrated by FIG. 5, the adjacent pairs of rollers 56–57 are suitably spaced in accordance with the spacing between the opposed lead sections 17 which project toward one another from longitudinally adjacent I.C. devices.

The rollers 56–57 of each pair associated with the arrangement 55 are disposed sidewardly directly adjacent the corresponding pair of rollers 56'-57' associated with the roller arrangement 55'. Thus, the directly opposed rollers 56-56' define one cooperating pair of counter-rotating rollers having a narrow vertically oriented nip therebetween substantially as illustrated by FIG. 1, and the other pair of opposed rollers 57-57' similarly define another narrow vertically oriented nip therebetween. These nips thus accommodate therein the lead sections 17 as disposed on opposite sides of the resin package when the lead frame assembly is passed vertically upwardly between the roller arrangements 55,55'.

The roller assembly 25 also includes a second roller arrangement 65 which is mounted on the shaft 51 in axially spaced relationship from the arrangement 55. The roller arrangement 65 includes a single pair of axially spaced rollers 66 and 67, the later having interfitting hubs similar to the hubs 58 and 62 for permitting the rollers to be axially and releasably fixed to the shaft while being axially adjusted relative to the spacing W' therebetween. The spacing W' between the rollers 66,67 corresponds substantially to the width W' of the resin package when the lead frame assembly is oriented longitudinally substantially as illustrated by the assembly 10'' in FIG. 3. The rollers 66,67 have axial face widths Y' which equal or slightly exceed the length of the leads associated with the sidewardly projecting lead sections 16.

The opposed roller arrangements 65,65' hence define two opposed pairs of rollers 66,66' and 67,67' which define two narrow nips between the opposed pairs for accommodating the side lead sections 16 when a longitudinally oriented lead frame assembly is passed upwardly between the roller arrangements 65,65', as illustrated by the lead frame assembly 10'' in FIG. 3.

The individual roller pairs associated with both the arrangements 55,55' and 65,65' can be suitably axially adjusted so as to vary the widths W or W', this being indicated by the dotted line positions as shown by FIG. 3.

The other roller assembly 25' includes a rotatable shaft 51' which extends parallel with the shaft 51 and is sidewardly spaced therefrom so as to be on the horizontally opposite side of the slot 49. Shaft 51' has the opposite ends thereof freely rotatably supported in the upper ends of support arms 62, the latter being disposed adjacent the supports 23 and pivotally supported from the supports 23 by pivot shafts 63 which are disposed in the intermediate or center part of the support arms 62. These pivot shafts 63 are disposed downwardly a substantial distance below the shafts 51,51', and hence permit limited adjustable pivoting of the support arms 62 about the pivots 63 so that the shaft 51' can be moved inwardly toward or outwardly away from the other shaft 51 to hence adjust the gap or nip between the opposed roller assemblies.

As illustrated by FIG. 2, a tension spring 71 has one end thereof connected to the support arm adjacent the lower free end thereof, and this spring at its other end connects to a pin 72 which is anchored relative to the frame, whereby this spring urges the support arm 62 of FIG. 2 in a counterclockwise direction around the pivot 63 to thus continually urge the shaft 51' inwardly toward the shaft 51. To limit this inward urging of the shaft 51', the lower end of the arm 62 has a stop 73 thereon which abuts an adjustably positioned threaded stop screw 74 which is mounted on the frame, whereby the spring 71 hence urges this stop 73 against the stop screw 74 to control the normal inward position of the shaft 51'. A further stop 76 is provided on the upper part of the support arm 62 (that is, above the pivot 63), this latter stp 76 being adapted to abut against a further adjustable stop screw 77 as provided on the frame. This stop 76, when held against the stop screw 77, prevents the shaft 51' from being moved outwardly away from the shaft 51. The position of the shaft 51 can be fixedly locked by causing the two adjustable stop screws to abut their respective stops.

The shaft 51' has a driving element 81, such as a gear thereon, the latter being disposed in meshing engagement with the gear or driving element 52. This hence permits the shaft 51' to be synchronously and identically driven with the shaft 51 but in the opposite rotational direction. The meshing gear arrangement, however, also permits small adjustable displacement of the shaft 51' either toward or away from the shaft 51 without disrupting the driving engagement therebetween. If necessary, any other type of driving arrangement, such as a belt drive, can be provided if necessary since such will readily accommodate any adjustment in the sideward spacing between the shafts.

As illustrated by FIG. 1, the roller assemblies 25,25' are disposed upwardly above the bath on opposite sides of the slot 49 so the latter is substantially aligned with the nip defined between the opposed roller pairs on the two roller assemblies. Further, the roller assemblies are disposed so that the shafts 51,51' are spaced upwardly out of contact with the solder bath, and in fact the roller assemblies are positioned so that only the lower portion of the rollers 56,56', 57,57', 66,66' and 67,67' dip into the solder bath. In fact, the extent to which the rollers penetrate into the solder bath is such that only the annular flange defining the roller dips into the solder bath, and the mounting hub structure for the rollers preferably does not contact the solder bath. The actual penetration of the rollers into the solder bath is hence a very small extent, such as less than one-quarter and preferably less than one-sixth the diameter of the roller. Further, due to the manner in which the roller assemblies are disposed on opposite sides of and hence effectively straddle the discharge slot 49 through which the lead frame assemblies are fed, the opposed counter-rotating pairs of rollers thus effectively and respectively dip into the side chambers of the bath as disposed on opposite sides of the slot 49, which side chambers have the solder therein maintained at the same level due to their being in open communication with one another.

The operation of the machine 20 is believed apparent from the description set forth above. It will, however, be briefly summarized to ensure a thorough understanding thereof.

With the machine in operation so that the roller assemblies rotate in opposite directions substantially as indicated by the arrows in FIG. 5, then the lead frame assemblies are moved upwardly through the passage 43 and thence through the slot 49 so as to be fed between the nips defined by the opposing roller pairs. Due to the manner in which the roller pairs dip into the molten solder bath, the rollers in the region of the nips squeeze the lead section between the rollers and hence apply a uniform coating of solder to opposite sides of the lead section without causing bridging of solder between the leads, and without subjecting the resin package to contact with or immersion in the hot solder.

As illustrated by FIG. 3, the lead frame can be oriented with its lengthwise or longitudinal direction extending generally parallel with the axes of the roller assemblies, whereupon the lead frame assembly 10' can hence be moved upwardly so as to move through the plurality of opposed pairs associated with the roller arrangements 55,55', whereby all of the longitudinally extending lead sections 17 can hence be film coated with solder on opposite sides thereof.

On the other hand, to provide a solder coating on the lead sections 16 which extend along the side edges of the lead frame, then the lead frame assembly is oriented in its longitudinal direction and is fed upwardly through the slot 49 and thence between the nips defined between the roller arrangements 65,65', thereby applying a solder film to opposite sides of the edge lead sections 16.

In the disclosed arrangement, the lead frame assembly can be fed through the same machine twice, once in a transverse direction so as to be fed through the roller arrangements 55,55', and once longitudinally so as to be fed through the roller arrangements 65,65'. Alternately, two identical machines can be provided to permit transverse and longitudinal feeding of the lead frame assemblies at different stations, or the different stations can be provided with just the roller arrangements 55,55' at one station and just the roller arrangement 65,65' at the other station so as to solely permit transverse and longitudinal feeding at the respective stations. Providing both roller arrangements on a single machine, however, obviously increases the flexibility and usability of the machine.

The present invention also involves the construction of a machine as described herein, but wherein the machine includes only the roller arrangements 55,55' or 65,65', but not both at the same time. In fact, in a preferred embodiment, the machine of this invention includes only the roller arrangements 65,65'.

In the machine of the present invention, by adjusting the speed of rotation of the rollers, and/or by adjusting the dipping depth of the rollers into the bath, the thickness of the coating as applied to the lead frames can be suitably adjusted as desired. Further, not only does this permit selection and control over the thickness of the solder coating applied to the lead section, but this improved machine permits a controllable uniform coating to be applied over the lead sections, which coating can be applied to both sides of the lead sections simultaneously, thereby greatly expediting both the rate and uniformity of coating while at the same time greatly minimizing the rejection rate of the I.C. devices.

It will be apparent that the lead frame assemblies can be fed into and away from the solder machine using many different types of conventional handling and transferring devices, and hence such devices have not been illustrated. If necessary, the machine can be fed manually.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a solder coating machine for simultaneously applying thin solder coatings to opposite sides of lead sections which project outwardly from resin packages as associated with I.C. devices mounted in longitudinally spaced relationship on an elongate lead frame so as to define a lead frame assembly, said machine comprising:

a housing;
wall means defining an upwardly extending passage terminating at its upper end in a narrow upwardly opening slot for permitting lead frame assemblies to pass vertically therethrough;
tank means including first and second sidewardly spaced chambers containing a molten liquid solder bath therein and disposed closely adjacent and on opposite sides of said passage, the surface level of the molten solder bath in said chambers being at an elevation slightly below the elevation of said slot;
roller means for simultaneously applying a uniform coating of molten solder to opposite side surfaces of lead sections which project outwardly from opposite side of the respective resin package without subjecting the resin package to contact with the molten solder;
said roller means including first and second horizontally-opposed roller assemblies respectively having first and second shafts which are horizontally sidewardly disposed to extend in generally parallel and generally horizontal relationship, said first and second shafts being disposed on opposite sides of said slot and in upwardly spaced relationship from the surface level of the solder bath;

drive means interconnected to said first and second roller assemblies for effecting simultaneous rotation thereof in opposite directions;

said first and second roller assemblies respectively including first and second roller arrangements supported for rotation about the longitudinally extending axis of the respective shaft, each of said first and second roller arrangements including first and second rollers disposed in axially aligned and axially spaced relationship with one another so as to define an annular space of predetermined axial dimension therebetween so as to accomodate the resin package and prevent application of molten solder thereto, the first rollers of said first and second arrangements being disposed directly adjacent one another to define a first narrow nip therebetween which is vertically aligned above said slot, and said second rollers of said first and second arrangements being disposed directly adjacent one another to define a second narrow nip therebetween which is vertically aligned above said slot; and the rollers of said first and second roller arrangements being disposed so that only lower portions thereof as disposed below the respective shafts dip into the molten solder bath associated with said first and second chambers respectively, whereby a lead frame assembly can be fed vertically through the slot so that the lead sections pass through the nips between the opposed pairs of first and second rollers to permit application of a solder coating to opposite sides of the lead sections associated with the lead frame assembly, while permitting the resin package to pass through the annular space defined axially between the first and second rollers.

2. A machine according to claim 1, wherein the roller arrangement associated with each of said first and second roller assemblies includes a plurality of pairs of said first and second rollers associated with the respective shaft and disposed in axially spaced relationship along the shaft for permitting an elongated lead frame assembly to be passed vertically between the roller assemblies with the lead frame assembly having its lengthwise direction extending generally parallel with the axes of the shafts as it passes between the roller assemblies so that each pair of said first and second rollers straddle a single resin package.

3. A machine according to claim 2, wherein said first and second roller assemblies respectively include third and fourth roller arrangements which are respectively mounted on said first and second shaft and are spaced axially from the respective first and second roller arrangements, said third and fourth roller arrangement each including only a single pair of axially spaced rollers which are disposed with the lower parts thereof dipping into the solder bath for permitting a lead frame assembly to be fed vertically between said third and fourth roller arrangements while the lead frame assembly is oriented with its longitudinal direction extending generally vertically.

4. A machine according to claim 1, including means for selectively adjusting the elevation of the surface level of the solder bath relative to the rollers for adjusting the depth by which the rollers dip into the bath.

5. A machine according to claim 1, including means for selectively adjusting the predetermined axial dimension of the annular space as defined between the first and second rollers as associated with each said roller arrangement.

6. In a solder coating machine for solder coating lead frame assemblies, said lead frame assembly including a horizontally elongate lead frame having a plurality of I.C. devices mounted thereon in substantially uniform spaced relationship along the horizontally elongate direction thereof, each of said I.C. devices including a sidewardly projecting resin package and a pair of lead sections which project outwardly from opposite sides of the respective resin package substantially along the horizontally elongate direction, said machine comprising:

wall means defining an upwardly extending passage terminating at its upper end in a narrow upwardly opening slot for permitting the horizontally elongate lead frame assembly to pass vertically therethrough;

tank means including first and second sidewardly spaced chambers containing a molten liquid solder bath therein and disposed closely adjacent and on opposite sides of said passage, the molten solder bath in said chambers having a surface level at an elevation slightly below the elevation of said slot;

roller means defining a vertically oriented nip disposed upwardly from and substantially vertically aligned with said slot for applying a substantially uniform molten solder coating to opposite side surfaces of the lead sections associated with the plurality of I.C. devices as the horizontally elongate lead frame assembly moves vertically through the nip;

said roller means including first and second roller assemblies which are horizontally sidewardly disposed so as to extend in generally parallel and generally horizontal relationship, said first and second roller assemblies being substantially identical and disposed in generally horizontally opposed relationship on opposite sides of said slot so as to define said nip therebetween;

drive means drivingly interconnected to said first and second roller assemblies for effecting simultaneous rotation thereof in opposite rotational directions;

each said roller assembly including a plurality of pairs of solder-coating rollers, each pair including two axially adjacent rollers which define an annular clearance space therebetween of predetermined axial dimension so that said annular clearance space can freely accommodate therein a said resin package, and said plurality of pairs also being uniformly axially spaced so that the rollers of each pair will accommodate one of said resin packages within the respective annular clearance space as the horizontally elongate lead frame assembly passes vertically through the nip between the first and second roller assemblies; and the rollers of said pairs being disposed at an elevation so that only lower portions of said rollers dip into the molten solder bath associated with said first and second chambers, said rollers being disposed so that the lower portions thereof penetrate into said bath by a depth which is no more than about one-fourth the diameter of said rollers.

7. A machine according to claim 6, wherein each said roller assembly includes a rotatable support shaft having said pairs of rollers nonrotatably mounted thereon in concentric relationship thereto, and means associated with said pair of rollers for permitting adjustment in the axial dimension of said annular clearance space as associated with each pair and for also permitting adjustment in the axial spacing between adjacent pairs.

* * * * *